(12) United States Patent
Lee (10) Patent No.: US 11,370,123 B2
(45) Date of Patent: Jun. 28, 2022

(54) MOBILE ROBOT AND METHOD OF CONTROLLING THE SAME

(71) Applicant: LG ELECTRONICS INC., Seoul (KR)

(72) Inventor: Wonhee Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 367 days.

(21) Appl. No.: 16/490,469

(22) PCT Filed: Jun. 17, 2019

(86) PCT No.: PCT/KR2019/007257
§ 371 (c)(1),
(2) Date: Aug. 30, 2019

(87) PCT Pub. No.: WO2020/256159
PCT Pub. Date: Dec. 24, 2020

(65) Prior Publication Data
US 2021/0402610 A1     Dec. 30, 2021

(51) Int. Cl.
*B25J 11/00*     (2006.01)
*B25J 9/16*     (2006.01)
(Continued)

(52) U.S. Cl.
CPC .............. *B25J 9/1697* (2013.01); *B25J 5/007* (2013.01); *B25J 9/0003* (2013.01); *B25J 9/0009* (2013.01);
(Continued)

(58) Field of Classification Search
CPC ....... B60W 60/00256; B60W 2420/42; B60W 2540/21; G05D 1/12; G05D 1/0022;
(Continued)

(56) References Cited

U.S. PATENT DOCUMENTS

| 9,535,421 B1 | 1/2017 | Canoso et al. |
| 10,906,185 B2 * | 2/2021 | Deyle .................... B25J 9/1694 |

(Continued)

FOREIGN PATENT DOCUMENTS

| KR | 10-2008-0008528 | 1/2008 |
| KR | 10-2008-0090150 | 10/2008 |

(Continued)

OTHER PUBLICATIONS

Maxwell et al., Alfred: The Robot Waiter Who Remembers You, 1999, Internet, p. 1-12 (Year: 1999).*

(Continued)

*Primary Examiner* — McDieunel Marc
(74) *Attorney, Agent, or Firm* — KED & Associates LLP (57) ABSTRACT

A method may be provided for controlling a mobile robot. This may include receiving user input including a predetermined service request by the mobile robot, receiving an article to be served, by the mobile robot, searching for a user, analyzing a gesture of the user, and extracting a serving position, by the mobile robot, analyzing an image of the serving position and extracting a distance and height of the serving position, moving the mobile robot to the serving position and lifting the served article to be served, to a height of the serving position, and putting down the article to be served at the serving position by horizontally moving the article to be served to the serving position.

16 Claims, 10 Drawing Sheets

(51) Int. Cl.
*G06V 40/20* (2022.01)
*B25J 5/00* (2006.01)
*B25J 9/00* (2006.01)
*B25J 19/02* (2006.01)

(52) U.S. Cl.
CPC .......... *B25J 11/008* (2013.01); *B25J 19/023* (2013.01); *G06V 40/20* (2022.01)

(58) Field of Classification Search
CPC .............. G05D 1/0088; G05D 1/0231; G05D 2201/0203; B62D 33/08; B62D 33/02; G10L 5/22; B25J 11/008; B25J 13/08; B25J 19/061; B25J 9/1664; B25J 9/1674; B25J 9/1679; B25J 9/1697; G01C 21/3476; G06Q 30/0617; G06Q 30/0631; B62B 3/14
See application file for complete search history.

(56) References Cited

U.S. PATENT DOCUMENTS

| | | | |
|---|---|---|---|
| 10,913,160 B2* | 2/2021 | Deyle | B25J 9/1697 |
| 11,082,667 B2* | 8/2021 | Deyle | G01C 21/206 |
| 11,148,882 B2* | 10/2021 | Mohan | G05D 1/0297 |
| 2004/0190776 A1 | 9/2004 | Higaki et al. | |
| 2021/0323581 A1* | 10/2021 | Ju | B62D 33/02 |

FOREIGN PATENT DOCUMENTS

| | | |
|---|---|---|
| KR | 10-2010-0110143 | 10/2010 |
| KR | 10-2012-0100505 | 9/2012 |

OTHER PUBLICATIONS

Franklin et al., Happy Patrons Make Better Tippers Creating a Robot Waiter Using Perseus and the Animate Agent Architecture, 1996, IEEE, p. 253-258 (Year: 1996).*

Tabata et al., Recognition of request through hand gesture for mobile care robots, 2013, IEEE, p. 8312-8316 (Year: 2013).*

Kaobayashi et al., A considerate care robot able to serve in multi-party settings, 2011, IEEE, p. 27-32 (Year: 2011).*

Garcia-Haro et al., Balance Computation of Objects Transported on a Tray by a Humanoid Robot Based on 3D Dynamic Slopes, 2018, IEEE, p. 704-709 (Year: 2018).*

International Search Report dated Mar. 17, 2020 issued in PCT Application No. PCT/KR2019/007257.

* cited by examiner

MOBILE ROBOT AND METHOD OF CONTROLLING THE SAME

CROSS-REFERENCE TO RELATED PATENT APPLICATIONS

This application is a U.S. National Stage Application under 35 U.S.C. § 371 of PCT Application No. PCT/KR2019/007257, filed Jun. 17, 2019, whose entire disclosures are hereby incorporated by reference.

TECHNICAL FIELD

The present invention relates to a mobile robot and a method of controlling the same for vertically and horizontally moving an article according to the eight of a destination to a final destination while a mobile artificial intelligence robot for serving the article travels.

BACKGROUND ART

Robots have been developed for industrial use to manage some parts of factory automation. Recently, the application fields of robots have further expanded, leading to the development of medical robots, aerospace robots, etc. and the manufacture of robots used in general homes for domestic uses. Among such robots, an autonomous mobile robot is referred to as a mobile robot.

With the increase in the use of robots, the demand for robots capable of providing various kinds of information, entertainment, and services in addition to the repeated performance of simple functions has increased.

Accordingly, various kinds of robots for use in a home, restaurants, stores, and public facilities so as to provide convenience to people are being developed.

In addition, various kinds of services using a mobile robot that is capable of autonomously traveling have been proposed. For example, the cited reference (Korean Patent Application Publication No. 10-2008-0090150, Published on Oct. 8, 2008) proposes a service robot capable of providing a service based on a current position thereof while moving in a service area, a service system using the service robot, and a method of controlling the service system using the service robot.

In addition, the cited reference (U.S. Pat. No. 9,535,421, published on Jan. 3, 2017) discloses a serving robot. The serving robot disclosed in U.S. Pat. No. 9,535,421 is configured in such a way that a touch-based display for providing an interface of a user request and a container for accommodating a serving article are disposed in the serving robot. When a user puts a serving article in a container of a serving robot and receives input of a moving position related to the serving article through a display, the serving article is detected by an article sensor, the container is sealed, and then delivery begins.

When such a serving robot arrives at the moving position, the user needs to directly take out the serving article from the corresponding container.

Accordingly, the serving robot simply moves the serving article within the container only to a corresponding position rather than exactly delivering the serving article to a desired position, and in particular, the serving robot does not take out the serving article and does not directly transfer the same to a user.

CITED REFERENCE

Patent Document

Korean Patent Publication No. 10-2008-0090150 (Published on Oct. 8, 2008)
U.S. Pat. No. 9,535,421 (Published on Jan. 3, 2017)

DISCLOSURE

Technical Problem

It is a first object of the present invention to provide a serving robot for directly receiving a serving article and providing the serving article to a user at a position desired by the user without a user operation of receiving the serving article.

It is a second object of the present invention to provide a serving robot for determining a user at a serving position, reading a gesture of the user from an image, and determining a table on which the serving article is to be put in order to put the serving article at an accurate position.

It is a third object of the present invention to provide a serving robot for determining the position and height of a table through object recognition, and vertically moving a tray to the height of the table to provide the serving article on the table desired by the user.

It is a fourth object of the present invention to provide a serving robot for moving a serving article on a tray to the top of a table at a desired height through vertical and horizontal movement of the tray on which the serving article is positioned.

Technical Solution

In accordance with the present invention, the above and other objects can be accomplished by the provision of a method of controlling a mobile robot, including receiving user input including a predetermined service request by the mobile robot, receiving an article to be served, by the mobile robot, searching for a user, analyzing a gesture of the user, and extracting a serving position, by the mobile robot, analyzing an image of the serving position and extracting a distance and height of the serving position, moving the mobile robot to the serving position and lifting the article to be served, to a height of the serving position, and putting down the article to be served at the serving position by horizontally moving the article to be served to the serving position.

The mobile robot may include at least one tray for accommodating the article to be served therein and moves the at least one tray in upward and downward directions to lift the article to be served to the height of the serving position.

The tray may include a plurality of rollers configured to horizontally move the article to be served, and may rotate the roller to put the article to be served, at the serving position.

An image received from an image acquisition unit of the mobile robot may be converted into a 3D image, and an outer shape of the user and the gesture of the user may be recognized from the 3D image to extract the serving position.

The extracting the distance and height of the serving position may include acquiring the image of the serving position from the image acquisition unit and performing object learning to extract the distance and height of the serving position.

The receiving the user input may include receiving order information on the article to be served and information on a target serving position, from a user terminal.

The receiving the user input may include receiving order information on the article to be served and information on a target serving position, from a server.

The method may further include searching for the user at a short distance from the target serving position, following the user, and acquiring an image of the user, by the mobile robot.

The mobile robot may acquire an image in which the article to be served is put at the serving position, may transmit information indicating serving is completed to the server, and may return to a start point.

In accordance with another aspect of the present invention, there is provided a mobile robot incudes a body forming an outer shape, a driving unit configured to move the body, an image acquisition unit configured to capture an image of a traveling area and to generate image information, at least one tray configured to support an article to be served, and a control unit configured to receive order information of the article to be served, and to control the tray to search for a user, to analyze a gesture of the user, to extract a serving position, and to put down the article to be served at the serving position.

The control unit may analyze an image of the serving position and may extract a distance and height of the serving position.

The control unit may drive the tray to put down the article to be served at the serving position by horizontally moving the article to be served to the serving position.

The mobile robot may include an up and down movement motor configured to move the tray in upward and downward direction.

The tray may include a plurality of rollers configured to horizontally move the article to be served and to push the article to be served.

The mobile robot may further include a horizontal movement motor configured to rotate the plurality of rollers of the tray.

The control unit may convert an image received from the image acquisition unit into a 3D image, and may recognize an outer shape of the user and the gesture of the user from the 3D image to extract the serving position.

The control unit may acquire the image of the serving position from the image acquisition unit and may perform object learning to extract the distance and height of the serving position.

The mobile robot may include the plurality of trays that are disposed in parallel to each other in a vertical direction and are moveably installed in upward and downward direction.

The mobile robot may further include a communication unit configured to receive order information on the article to be served and information on a target serving position, from a user terminal or a server.

The mobile robot may acquire an image in which the article to be served is put at the serving position, may transmit information indicating serving is completed to the server, and may return to a start point.

Advantageous Effects

According to the above technical solution, the present invention may provide a serving robot for directly receiving a serving article and providing the serving article to a user at a position desired by the user without a user operation of receiving the serving article.

The serving robot may determine a user at a serving position, may read a gesture of the user from an image, and may determine a table on which the serving article is to be put in order to put the serving article at an accurate position.

The serving robot may determine the position and height of a table through object recognition, and may vertically move a tray to the height of the table to provide the serving article on the table desired by the user.

In addition, the serving robot may move a serving article on a tray to the top of a table at a desired height through vertical and horizontal movement of the tray on which the serving article is positioned.

BEST MODE

Terms indicating directions, such as "front (F)/rear (R)/left (Le)/right (Ri)/up (U)/down (D)" used below are defined based on the accompanying drawings, but they are used only to promote a clear understanding of the present invention, and the definition of directions is changed according to a reference.

Terms such as "first" and "second" are used herein merely for the purpose of distinguishing one constituent element from another constituent element, and do not define the order, importance, or master-servant relationship of components. For example, it may be possible to embody the invention so as to include only the second component without the first component.

Components in the following drawings may be exaggerated, omitted, or schematically illustrated for convenience and clarity of explanation. The sizes and areas of the components do not accurately reflect their actual sizes.

In addition, angles and directions used in description of the configuration of the present invention are based on the accompanying drawings. If a reference or a positional relationship between angles is not clearly set forth in the description of the configuration in the specification, the related drawings are to be referred to.

Hereinafter, a serving robot, among mobile robots, will be exemplified with reference to FIGS. 1 to 5, but the present invention does not need to be limited thereto.

Figure 1:
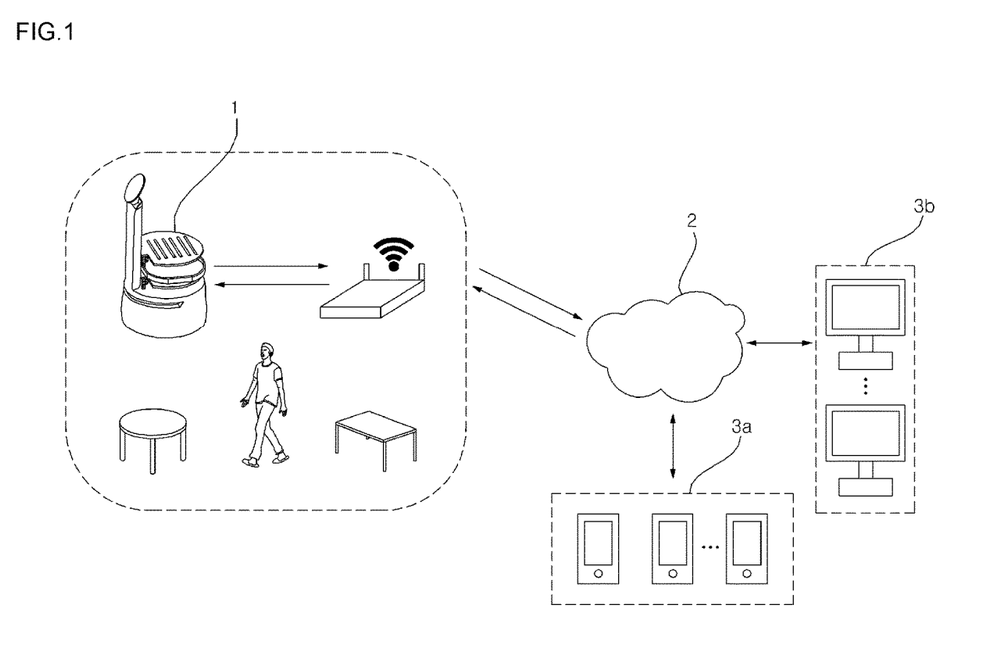
FIG. 1 is a diagram showing a configuration of a mobile robot system according to an embodiment of the present invention.
Figure 2:
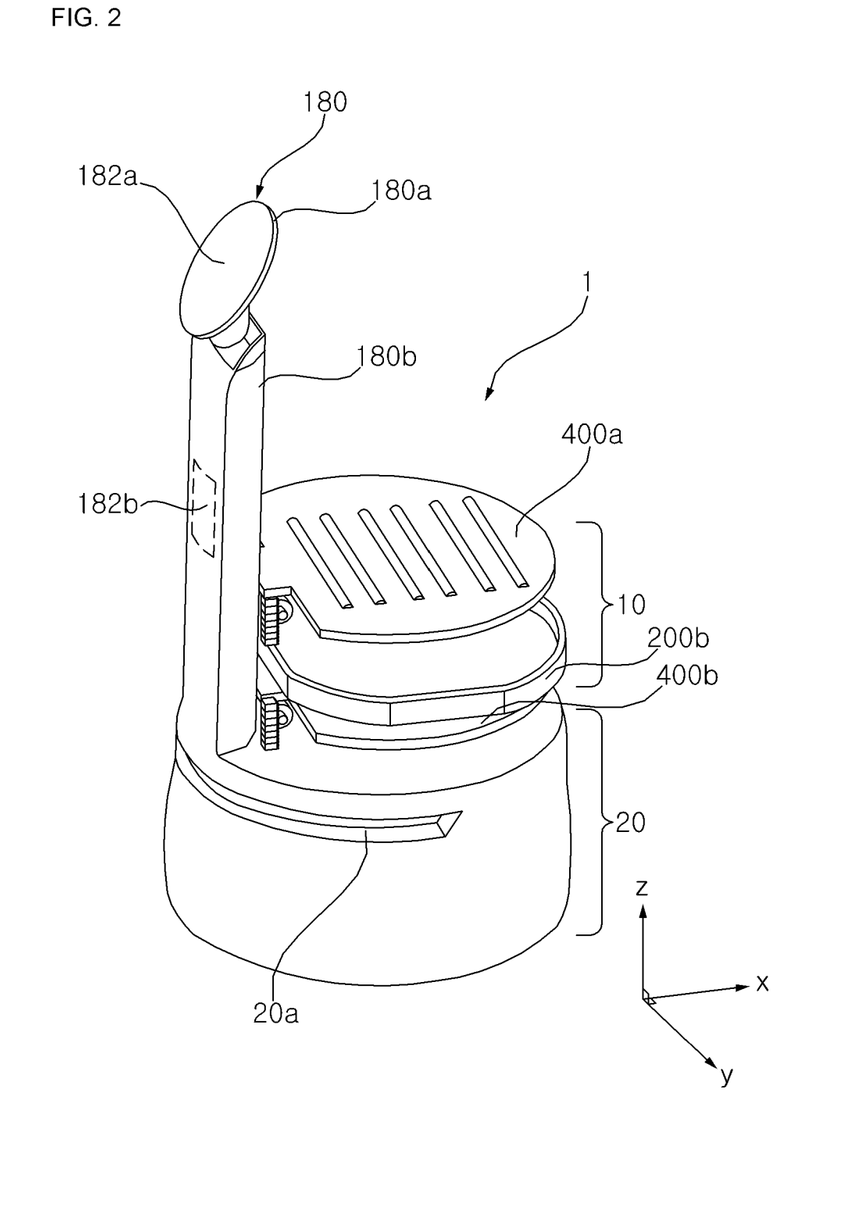
FIG. 2 is an elevation view showing a side surface of the mobile robot of FIG. 1.
Figure 3:
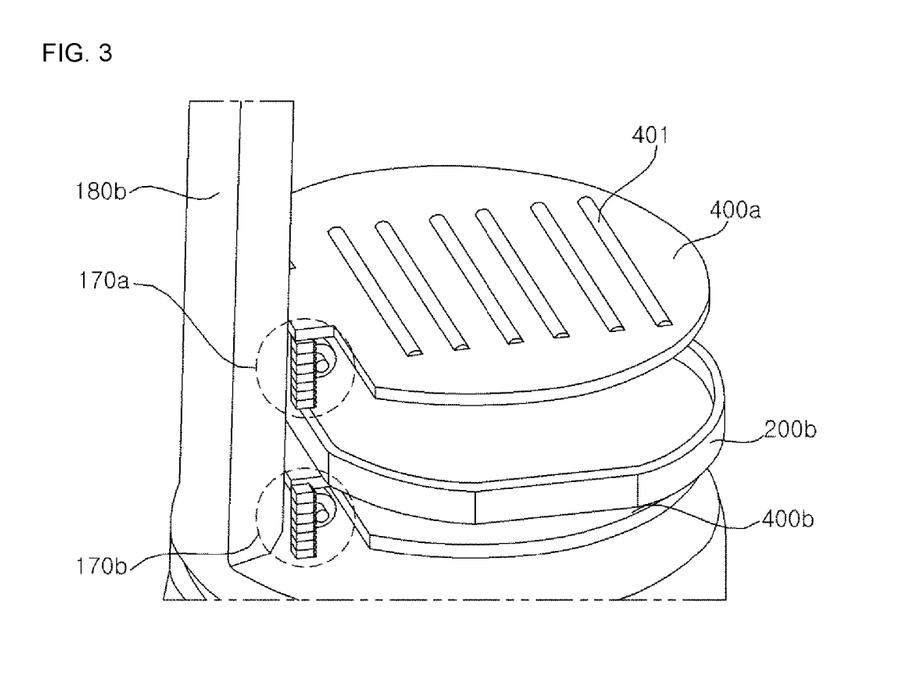
FIG. 3 is an elevation view showing a tray of the mobile robot of FIG. 1 viewed from the above.
Figure 4:
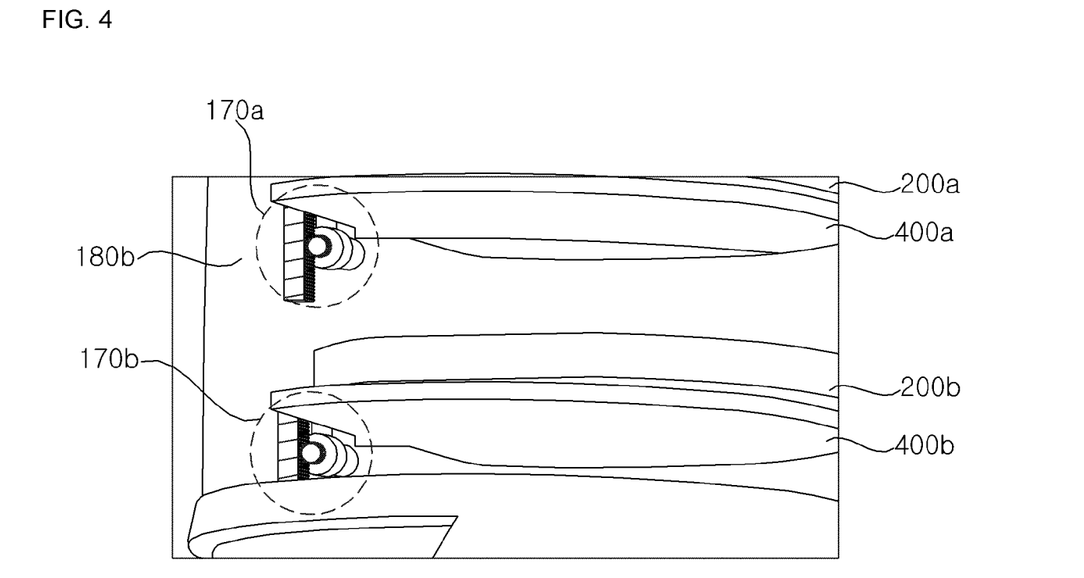
FIG. 4 is an enlarged view of a side surface of the tray of FIG. 3.
Figure 5:
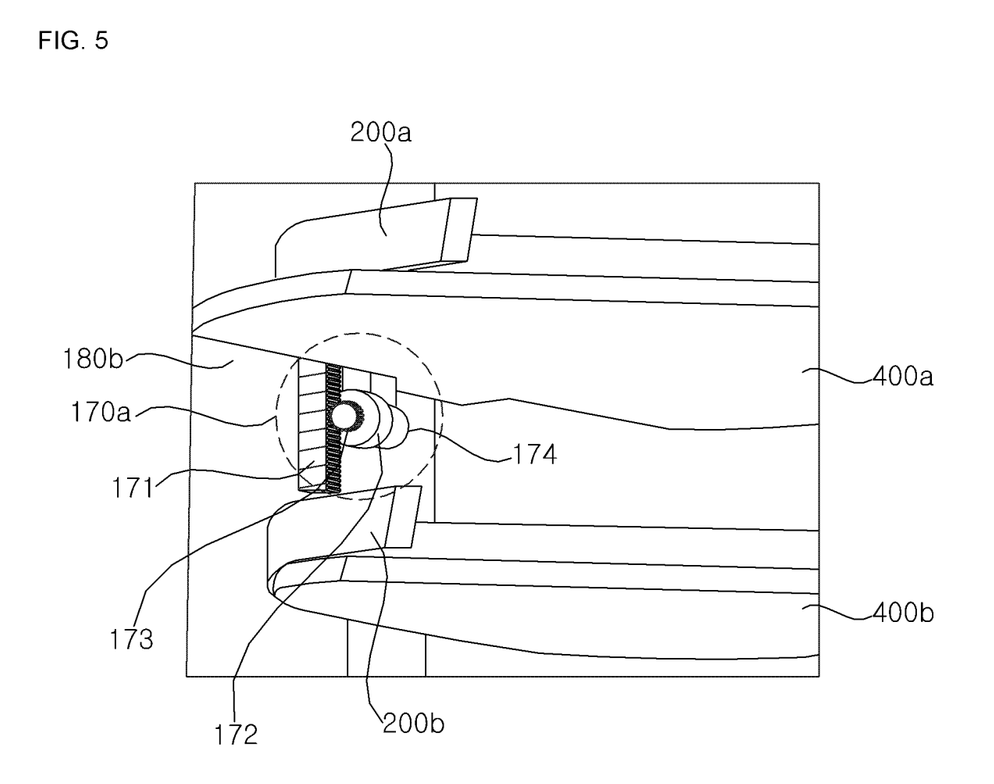
FIG. 5 is an elevation view showing the tray of FIG. 3 viewed from the below.

FIG. 1 is a diagram showing a configuration of a mobile robot system according to an embodiment of the present invention. FIG. 2 is an elevation view showing a side surface of the mobile robot of FIG. 1. FIG. 3 is an elevation view showing a tray of the mobile robot of FIG. 1 viewed from the above. FIG. 4 is an enlarged view of a side surface of the tray of FIG. 3. FIG. 5 is an elevation view showing the tray of FIG. 3 viewed from the below.

Referring to FIG. 1, the robot system according to an embodiment of the present invention may include one or more robots 1 and may provide a service in various places such as a restaurant, a home, a hotel, a market, a clothing store, a warehouse, and a hospital. For example, the robot system may include a serving robot 1 that interacts with a user in a home or the like and carries a predetermined article to a position desired by a user based on user input.

The robot system according to an embodiment of the present invention may include the plurality of serving robots 1 and a server 2 configured to manage and control the plurality of serving robots 1.

The server 2 may remotely monitor and control states of the plurality of robots 1, and the robot system may provide a more effective service using the plurality of robots 1.

The plurality of robots 1 and the server 2 may include a communication device for supporting one or more communication standards, and may communicate with each other. The plurality of robots 1 and the server 2 may communicate with a personal computer (PC), a mobile terminal, or another external server.

For example, the plurality of robots 1 and the server 2 may be embodied to perform wireless communication using wireless communication technology such as IEEE 802.11 WLAN, IEEE 802.15 WPAN, UWB, Wi-Fi, ZigBee, Z-wave, Bluetooth, or the like. The robot 1 may be changed depending on a communication method of other communication target devices or the server 2.

In particular, the plurality of robots 1 may embody wireless communication with other robot 1 and/or the server 2 through a 5G network. When the robot 1 performs wireless communication through a 5G network, real-time response and real-time control may be possible.

The plurality of robots 1 and the server 2 may communicate with each other using a message queuing telemetry transport (MQTT) method or a hypertext transfer protocol (HTTP) method.

The plurality of robots 1 and the server 2 may communicate with a PC, a mobile terminal, or other external servers using the HTTP or MQTT method.

Depending on the cases, the plurality of robots 1 and the server 2 may support two or more communication standards and may use the optimum communication standard depending on the type of communication data, or the type of device that participates in communication.

A user may check or control information on the robots 1 in the robot system through a PC 3a, a mobile terminal 3b, or the like.

In the specification, the 'user' may be a person who uses a service through at least one robot, and may include an individual consumer who purchases or rents a robot and uses the robot in a home or elsewhere, managers and employees of a company that provides a service to an employee or a consumer using a robot, and consumers that use a service provided by such a company. Thus, the 'user' may include business-to-consumer (B2C) and business-to-business (B2B) cases.

The server 2 may be embodied as a cloud server, and the user may use data stored in the server 2, which is connected for communication to various devices such as the PC 3a, the mobile terminal 3b, or the like and a function and a service that are provided by the server 2. The cloud server 2 may interwork with the robot 1, may monitor and control the robot 1, and may remotely provide various solutions and contents.

The server 2 may collectively control the robots 1 in the same way, or may separately control the robots. The server 2 may organize at least some of the robots 1 into groups, and may control the groups individually.

The server 2 may include a plurality of servers in which information and functions are distributed and configured or may be configured with one integrated server.

The robot 1 and the server 2 may each include a communication device (not shown) for supporting one or more communication standards, and may communicate with each other.

The robot 1 may transmit data related to space, an object, or usage thereof to the server 2.

Here, the data related to space or an object may be recognition relevant data of space or an object that is recognized by the robot 1 or may be image data of space or an object, which is acquired by an image acquisition unit.

In some embodiments, the robot 1 and the server 2 may include artificial neural networks (ANN) in the form of software or hardware that is trained to recognize at least one of the attributes of a user, speech, or space, or the attributes of an object such as an obstacle.

According to an embodiment of the present invention, the robot 1 and the server 2 may include a deep neural network (DNN) such as a convolutional neural network (CNN), a recurrent neural network (RNN), or a deep belief network (DBN), which is trained through deep learning. For example, a deep neural network (DNN) such as a convolutional neural network (CNN) may be installed in a control unit 140 of the robot 1.

The server 2 may train a deep neural network (DNN) based on data received from the robot 1, data input by the user, or the like, and may then transmit updated deep neural network (DNN) data to the robot 1. Accordingly, the deep neural network (DNN), which embodies artificial intelligence in the robot 1, may be updated.

The data related to usage may be data acquired along with use of a predetermined good, e.g., the robot 1 and may correspond to usage history data, a detection signal acquired from a sensor unit 110, or the like.

The trained deep neural network (DNN) may receive input data for recognition, may recognize the attributes of a person, an object, and space included in which input data, and may output the result.

The trained deep neural network (DNN) may receive the input data for recognition, may analyze and learn the data related to usage of the robot 1, and may recognize a usage pattern, a usage environment, or the like.

The data related to space, an object, or usage may be transmitted to the server 2 through a communication unit 190.

The server 2 may train the deep neural network (DNN) based on the received data and may then transmit the updated deep neural network (DNN) data to the mobile robot 1 to update the same.

Accordingly, the robot 1 may become smarter and may provide a user experience (UX) in which the robot 1 evolves the more the user uses it.

The robot 1 and the server 2 may also use external information. For example, the server 2 may provide an excellent user experience (UX) by synthetically using external information acquired from other associated service servers (not shown).

According to the present invention, the robot 1 may output speech for actively providing information beforehand or recommending a function or a service to provide more various and active control function to the user.

FIGS. 2 to 5 are diagrams showing an example of the serving robot 1 for carrying a predetermined article.

Referring to the drawings, the serving robot 1 may move through autonomous traveling and following and may further include a serving tray for accommodating an article to be served. For example, a serving article in a hotel may correspond to a towel, a toothbrush, toothpaste, bath supplies, bedding, beverage, food, a room service, other small home appliances, or the like. In addition, a serving article in a restaurant may be ordered beverage or food.

The serving robot 1 may deliver the article to be served to a destination determined by a user while autonomously travelling in a predetermined place and may serve the corresponding article to the destination.

A modular design may be applied to the serving robot 1 in order to provide an optimized service according to usage environments and uses.

For example, a basic platform may include a traveling module 20 including a wheel, a motor, or the like and being in charge of traveling, a UI module 180 including a display, a microphone, a speaker, or the like and being in charge of an interaction with the user, and a service module 10 providing a service such as storage of an article as a serving target.

Referring to the drawings, the traveling module 20 may include one or more openings 20*a*.

The openings 20*a* may be formed by cutting the traveling module 20 such that front light detection and ranging (LiDAR) (not shown) therein is operable, and may extend from the front to the side of the outer circumferential surface of the traveling module 20.

The front LiDAR may be disposed in the traveling module 20 so as to face the opening 20*a*. Consequently, the front LiDAR may emit a laser through the opening 20*a*.

Other opening (not shown), which is formed by cutting the traveling module 20 such that a rear LiDAR (not shown) therein is operable, may extend from the rear to the side of the outer circumferential surface of the traveling module 20, and may be formed such that the rear LiDAR therein is operable.

The rear LiDAR may be disposed to face the other opening in the traveling module 20. Accordingly, the rear LiDAR may emit a laser through the other opening.

The other opening may be formed by cutting the traveling module 20 such that a sensor disposed in the traveling module, such as a cliff sensor for sensing whether a cliff is present on a floor within a traveling area, is operable.

A sensor may be disposed on the outer surface of the traveling module 20. An obstacle sensor, such as an ultrasonic sensor, for sensing an obstacle may be disposed on the outer surface of the traveling module 20.

For example, the ultrasonic sensor may be a sensor for measuring the distance between an obstacle and each of the serving robots 1. The ultrasonic sensor may sense an obstacle that is near the serving robot 1.

In some embodiments, at least a portion of the UI module 180 may be configured so as to be rotatable. For example, the UI module 180 may include a head unit 180*a* rotatable in left and right directions and a body unit 180*b* for supporting the head unit 180*a*.

The head unit 180*a* may be rotated based on the operation mode and the current state of the serving robot 1.

The UI module 180 may further include a camera of an image acquisition unit 120. The camera may be disposed at the head unit 180*a* and may acquire image data in a predetermined range in the direction in which the head 180*a* is oriented.

For example, when the serving robot 1 detects a user, the head unit 180*a* may be rotated so as to orient the camera towards the identified user.

In some embodiments, the UI module 180 may include two displays 182*a* and 182*b*, and at least one of the two displays 182*a* and 182*b* may be configured with a touchscreen, and may also be used as an input device.

A service module 10 of the serving robot 1 may include at least one serving trays 400*a* and 400*b*.

The service module 10 may be disposed above the traveling module 20 in upward and downward directions (the z-axis direction) and may include the at least one serving trays 400*a* and 400*b*. In particular, two or more serving trays 400*a* and 400*b* may be formed in parallel to each other.

Each of the serving trays 400*a* and 400*b* may include space for accommodating/supporting a serving article and may stably carry the serving article. The serving trays 400*a* and 400*b* may be configured in plural number in a single serving robot 1 as shown in FIG. 2.

The serving trays 400*a* and 400*b* may be a plate-shaped tray with a predetermined area parallel to a floor (the xy plane), and the serving robot 1 may position an article to be served on the trays 400*a* and 400*b* and may move to the destination and may server the article.

In this case, the serving trays 400*a* and 400*b* may include a rotation roller unit 401 that pushes an article put thereon and puts the article on a serving position such as a table desired by a user.

As shown in FIGS. 2 and 3, the rotation roller unit 401 may include a plurality of rollers that are disposed over an entire surface of the serving trays 400*a* and 400*b* and the rollers may be simultaneously driven by a horizontal movement motor 174 to horizontally move the article put on the trays 400*a* and 400*b* forwards or backwards on a plane.

The serving robot 1 may further include couplers 170*a* and 170*b* that connects the plurality of serving trays 400*a* and 400 and the body unit 180*b* to each other to vertically move the plurality of serving trays 400*a* and 400*b*.

In detail, the couplers 170*a* and 170*b* may be formed on the serving trays 400*a* and 400*b*, respectively, and may include a rack gear 171 formed in a longitudinal direction on the body unit 180*b*, a pinion 173 that interworks with the rack gear 171 to vertically move the trays 400*a* and 400*b* upwards and downwards, and an up and down movement motor 172 that rotates the pinion 173 to vertically move the trays 400*a* and 400*b*.

As shown in FIGS. 4 and 5, the up and down movement motor 172 be attached to a lower surface of each of the trays 400*a* and 400*b* and may be disposed adjacent to a horizontal movement motor 174.

As such, the serving robot 1 may drive each of the horizontal movement motor 174 and the up and down movement motor 172 with respect to each of the trays 400*a* and 400*b* according to a control signal of the control unit 140 to move each of the serving trays 400*a* and 400*b* to a predetermined height and may push a serving article disposed on each of the serving trays 400*a* and 400*b* in a horizontal direction to directly transfer the serving article to a serving destination.

Hereinafter, an internal block for control of the serving robot 1 will be described.

Figure 6:
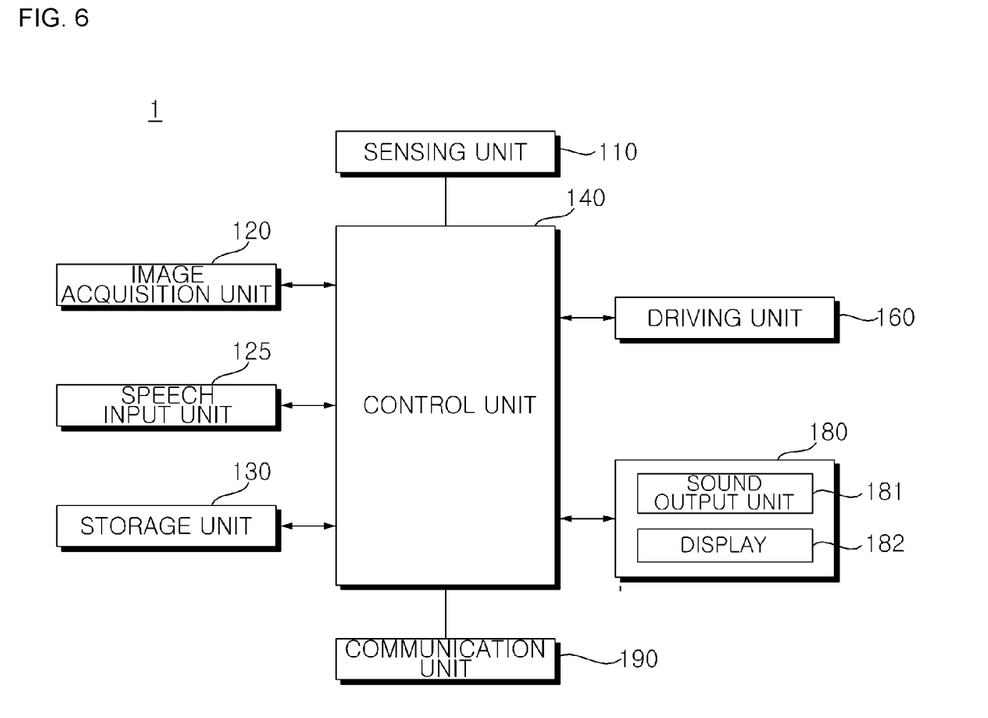
FIG. 6 is a block diagram showing a control relationship in the mobile robot of FIG. 1.

FIG. 6 is a block diagram showing a control relationship in the mobile robot of FIG. 1.

Referring to FIG. 6, the serving robot 1 according to an embodiment of the present invention may include the control unit 140 for controlling the overall operation of the serving robot 1, a storage unit 130 for storing various data, and the communication unit 190 for transmitting and receiving data to and from other devices such as the server 2 or the like The control unit 140 may control the storage unit 130, the communication unit 190, a driving unit 160, the sensor unit 110, an output unit 180, and the like within the serving robot 1, and may control the overall operation of the serving robot 1.

The storage unit 130, which stores various kinds of information necessary to control the serving robot 1, may include a volatile or nonvolatile recording medium. Examples of the recording medium, which stores data readable by a microprocessor, may include a hard disk drive (HDD), a solid state disk (SSD), a silicon disk drive (SDD), a ROM, a RAM, a CD-ROM, a magnetic tape, a floppy disk, and an optical data storage device.

The communication unit 190 may include at least one communication module, through which the serving robot 1 may be connected to the Internet or to a predetermined network and may communicate with another device.

In addition, the communication unit 190 may be connected to a communication module provided in the server 2 in order to process transmission and reception of data between the serving robot 1 and the server 2.

The serving robot 1 according to the embodiment of the present invention may further include a speech input unit 125 for receiving user speech input through a microphone.

The speech input unit 125 may include or may be connected to a processing unit for converting analog sound into digital data such that a user speech input signal can be recognized by the control unit 140 or the server 2.

The storage unit 130 may store data for speech recognition, and the control unit 140 may process the user speech input signal received through the speech input unit 125, and may perform a speech recognition process.

The control unit 140 may perform control such that the robot 1 performs a predetermined operation based on the result of speech recognition.

The serving robot 1 may include the output unit 180 in order to display predetermined information in the form of an image or to output the predetermined information in the form of sound.

The output unit 180 may include the displays 182a and 182b for displaying information corresponding to a command input by a user, the result of processing the command input by the user, the operation mode, the operation state, and an error state in the form of an image. In some embodiments, the serving robot 1 may include a plurality of displays 182a and 182b.

In some embodiments, at least some of the displays 182a and 182b may be connected to a touchpad in a layered structure so as to constitute a touchscreen. In this case, the display 182a constituting the touchscreen may also be used as an input device for allowing a user to input information by touch, in addition to an output device.

In addition, the output unit 180 may further include a sound output unit 181 for outputting an audio signal. The sound output unit 181 may output an alarm sound, a notification message about the operation mode, the operation state, and the error state, information corresponding to a command input by a user, and a result of processing the command input by the user in the form of sound under the control of the control unit 140. The sound output unit 181 may convert an electrical signal from the control unit 140 into an audio signal, and may output the audio signal. To this end, a speaker or the like may be provided.

In some embodiments, the serving robot 1 may further include the image acquisition unit 120 for capturing an image of a predetermined range.

The image acquisition unit 120 may include a camera module for photographing the surroundings, an external environment, or the like of the serving robot 1. A plurality of cameras may be installed at predetermined positions for efficient capturing.

The image acquisition unit 120 may capture an image for user recognition or an image for a virtual fitting service. The control unit 140 may determine an external situation or may recognize a user (guidance target) based on the image captured by the image acquisition unit 120.

When the robot 1 is a serving robot, the control unit 140 may perform control such that the robot 1 travels based on the image captured by the image acquisition unit 120.

The image captured by the image acquisition unit 120 may be stored in the storage unit 130.

The serving robot 1 may further include the driving unit 160 for movement, and the driving unit 160 may move the main body under the control of the control unit 140.

The driving unit 160 may include at least one driving wheel (not shown) for moving the main body of the robot 1. The driving unit 160 may include a driving motor (not shown) connected to the driving wheel for rotating the driving wheel. Driving wheels may be provided at left and right sides of the main body, and will hereinafter be referred to as a left wheel and a right wheel.

The left wheel and the right wheel may be driven by a single driving motor. If necessary, however, a left wheel driving motor for driving the left wheel and a right wheel driving motor for driving the right wheel may be individually provided. The direction in which the main body travels may be changed to the left or to the right based on the difference in the rotational speed between the left wheel and the right wheel.

The serving robot 1 may include the sensor unit 110 including sensors for sensing various kinds of data related to the operation and state of the serving robot 1.

The sensor unit 110 may further include an operation sensor for sensing the operation of the robot 1 and outputting operation information. For example, a gyro sensor, a wheel sensor, or an acceleration sensor may be used as the operation sensor.

The sensor unit 110 may include an obstacle sensor for sensing an obstacle. The obstacle sensor may include an infrared sensor, an ultrasonic sensor, an RF sensor, a geomagnetic sensor, a position sensitive device (PSD) sensor, a cliff sensor for sensing whether a cliff is present on a floor within a traveling area, and a light detection and ranging (LiDAR) unit.

The obstacle sensor senses an object, particularly an obstacle, present in the direction in which the mobile robot 10 travels (moves), and transmits information about the obstacle to the control unit 140. At this time, the control unit 140 may control the motion of the serving robot 1 depending on the position of the sensed obstacle.

The control unit 140 may perform control such that the operation state of the serving robot 1 or user input is transmitted to the server 2 through the communication unit 190.

When the serving robot 1 approaches a target position provided from a user, the control unit 140 may acquire an image of the surroundings from the image acquisition unit 120 at the corresponding position and may determine whether the user is present according to the image data.

In this case, when a user is present, a gesture of the user may be read, and an exact serving position on which an article to be served may be determined according to the gesture of the user.

Upon determining the target serving position, the control unit 140 may calculate the height, distance, or the like of the target position via object recognition to move the article through the driving unit 160, and may drive the vertical movement motor 172 and the horizontal movement motor 174 to accurately put down the serving article at the corresponding target position.

The control unit 140 may apply a camera pose extraction algorithm in order to determine the user gesture and to determine the target position from the image data and may determine a serving position, for example, a specific table through an object recognition algorithm.

Hereinafter, with reference to FIGS. 7 and 8, a serving control method of the serving robot 1 will be described in detail.

Figure 7:
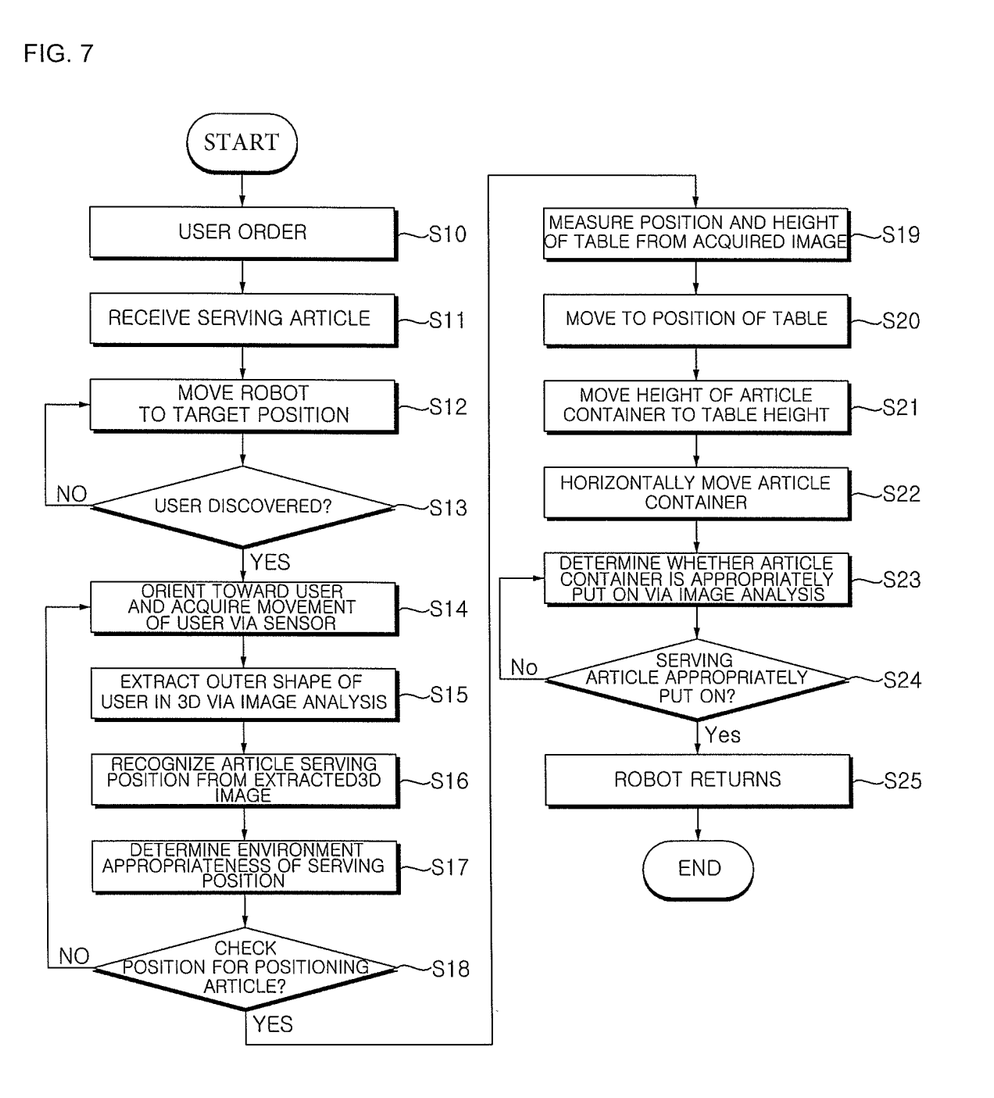
FIG. 7 is a flowchart showing a delivery method of the serving robot 1 of FIG. 1.

FIG. 7 is a flowchart showing a delivery method of the serving robot 1 of FIG. 1. FIGS. 8A to 8E show states based on the flowchart of FIG. 7.

First, a serving robot system may receive an order from a user (S10).

The order from the user may be received from a user terminal 3*b* or the user may access the server 2 and may make an order. Alternatively, the user may input order information by directly touching the display 182*a* of the serving robot 1

The order information may information on a target serving position and an object to be server, for example, in information on food or beverage selected in menu in the case of a restaurant.

As such, when the order information is input through the server 2, the server 2 may transmit the order information through the communication unit 190 of the serving robot 1.

As such, when the order information is received by the serving robot 1 through the display 182*a* or the communication unit 190, the serving robot 1 may receive the serving article (S11).

That is, the serving robot 1 may check the order information and may receive the corresponding serving article at a desk or a start point. The serving article may be recognized to be received by putting the serving article on the serving trays 400*a* and 400*b*.

In this case, in the case of a restaurant, as shown in FIG. 3, article containers 200*a* and 200*b* on which food is put may be disposed on the trays 400*a* and 400*b*, and upon recognizing the article containers 200*a* and 200*b* to be put on the trays 400*a* and 400*b*, the serving robot 1 may begin to move to a target delivery position (S12).

In this case, the serving robot 1 may receive map information of the corresponding area from the server, may indicate a corresponding target position on the map, and may move to the target position.

At a short distance of the target position, the control unit 140 of the serving robot 1 may perform user search (S13).

This user search may be performed by recognizing objects while continuously photographing the surroundings at a short distance through the image acquisition unit 120.

Figure 8A:
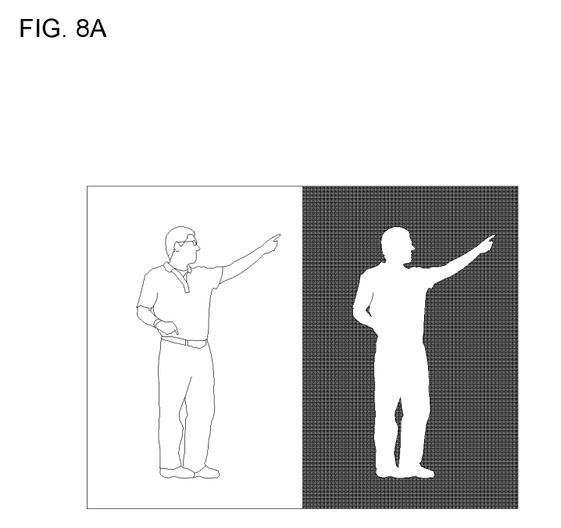
FIGS. 8A to 8E show states based on the flowchart of FIG. 7.

That is, as shown in FIG. 8A, when the control unit 140 inputs a portion of the acquired image into a learning engine, the learning engine may recognize at least one object or living entity included in the input image. In more detail, the control unit 140 may analyze feature points from the recognized object to recognize a user, that is, the shape of the human of the living entity.

When the control unit 140 recognizes a person present at a short distance from a target position, the control unit 140 may perform matching while following the corresponding person through the head unit 180*a*. The control unit 140 may assume the corresponding person to be a user and may acquire movement of the user through the image acquisition unit 120 and the sensor unit 110 (S14).

That is, the control unit 140 may continuously receive a 2D image from the image acquisition unit 120 and extract a corresponding image as a 3D image of an outer shape of a user through a global geometry network to determine a gesture of the user (S15).

In this case, the gesture of the user is determined by extracting the image through a cooperative holistic 3D indoor scene understanding scheme. That is, all of an object boundary box, a room layout, and a camera pose may be commonly restored in a 3D form and may be parameterized. The gesture of the user and the outer shape of the user may be estimated via such 3D camera pose conversion.

A serving position at the target position, on which the serving article is put down, may be accurately recognized according to the estimated gesture of the user (S16).

That is, as shown in FIG. 8A, when a gesture indicated by the finger of the user is recognized according to the gesture of the user, a place indicated by the corresponding gesture may be recognized as the serving position.

In this case, the recognized gesture may be variously changed according to settings, and may be set to finger point, a tap at a specific target position, or the like.

In this case, information on the recognized serving position may be recorded in the server 2 and the storage unit 130.

Then, the control unit 140 of the serving robot 1 may determine whether the recognized serving position is appropriate (S17).

That is, whether the serving position corresponds to a height that the trays 400*a* and 400*b* of the serving robot 1 are reached, whether the serving position includes a horizontal surface, and whether the corresponding serving position is adjacent to the target position may be determined.

Upon determining that the serving position is appropriate, the control unit 140 may acquire image information about the corresponding serving position from the image acquisition unit 120 and may extract a 3D image of the serving position through object learning (S18).

Figure 8B:
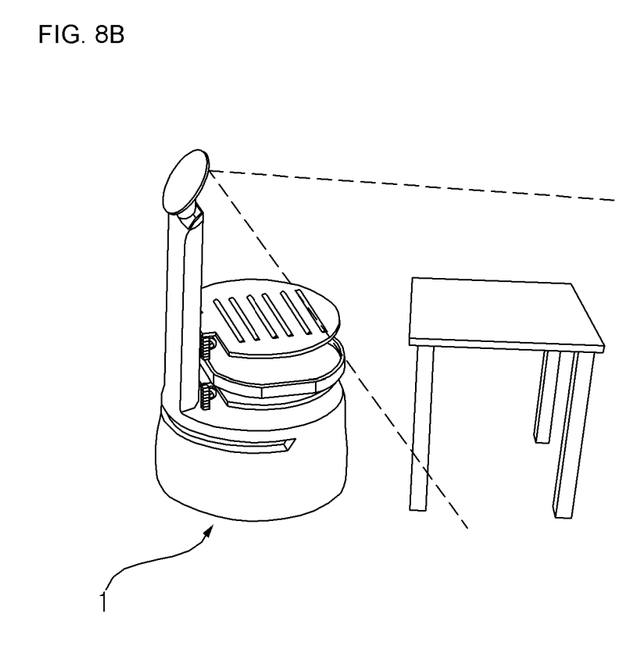

That is, as shown in FIG. 8B, when the serving position is the top of a table, the control unit 140 may acquire an image of the table, may extract a 3D image through object learning, and may measure the accurate position and height of the table (S19).

Upon acquiring information on the position and height of the table at the serving position through object learning, the control unit 140 may set a direction of the serving robot 1 to orient the trays 400*a* and 400*b* towards the position of the corresponding table and may control the driving unit 160 to move the serving robot 1 (S20).

Figure 8C:
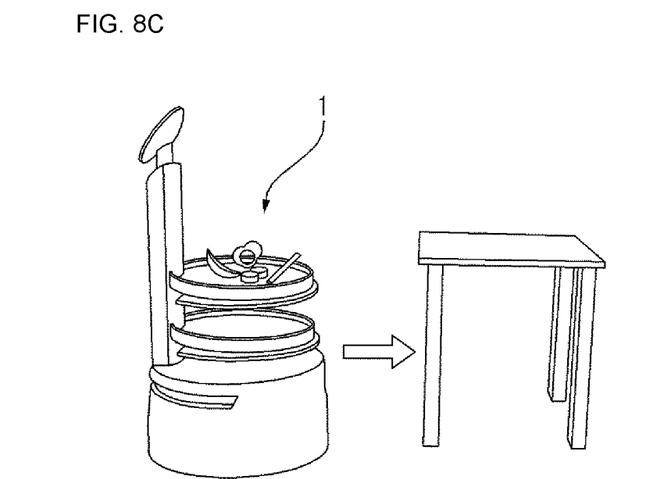

As shown in FIG. 8C, when the serving robot 1 completely moves until approaching the table, the control unit

Figure 8D:
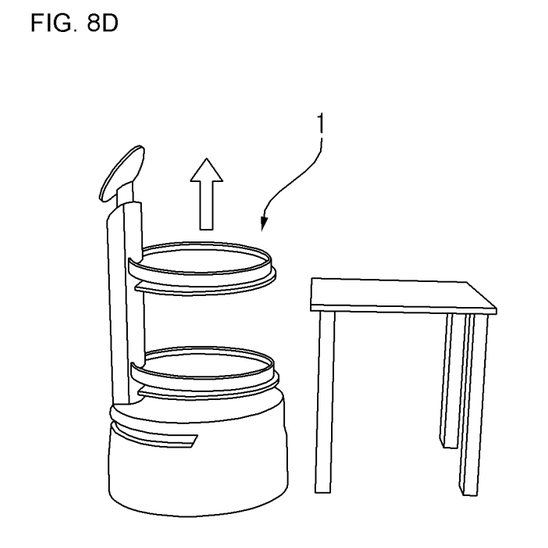

140 may drive the up and down movement motor 172 to move the trays 400a and 400b in upward and downward directions to the extracted height of the table, as shown in FIG. 8D (S21).

In this case, the trays 400a and 400b may be moved higher than the height of the table by a predetermined size in consideration of the size of the trays 400a and 400b.

Then, the horizontal movement motor 174 may be driven to rotate the rollers of the trays 400a and 400b in order to push the serving article to the table.

Figure 8E:
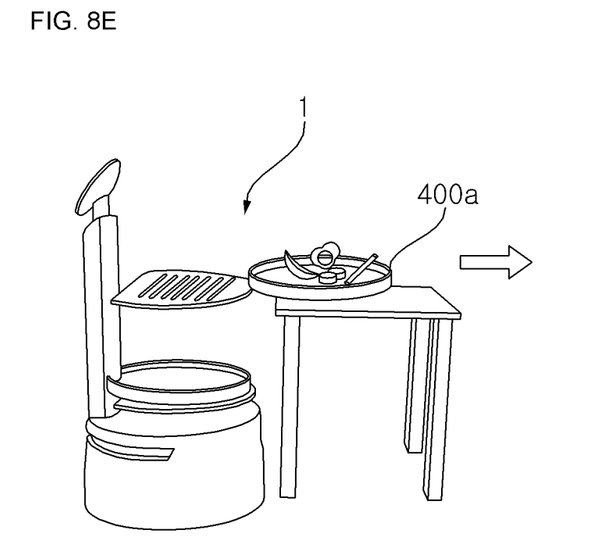

As shown in FIG. 8E, the control unit 140 may drive the horizontal movement motor 174 such that the roller unit 401 of the trays 400a and 400b rotates forwards according to rotation of a motor, and thus the article containers 200a and 200b disposed above the roller unit 401 may be moved in a horizontal direction.

Accordingly, when the article containers 200a and 200b are put on the table, the control unit 140 may analyze the image acquired through the image acquisition unit 120 (S23), and may analyze a detection signal from the sensor unit 110 to determine whether the article containers 200a and 200b positioned on the trays 400a and 400b are not present and whether the corresponding article containers 200a and 200b are accurately put on the table (S24).

Upon determining that the corresponding article containers 200a and 200b are accurately put on the table at the serving position, the control unit 140 may read map information and may drive the driving unit 160 of the serving robot 1 to a start point in order to make the serving robot 1 to return (S25).

As such, an image of the user may be analyzed to recognize the position of the serving article according to the gesture of the user, the height of the serving position or the like may be analyzed, and the serving article may be accurately put down at the corresponding position.

Accordingly, the serving robot 1 may put down an article at a position desired by the user without a user operation of separately receiving the article from the article containers 200a and 200b of the serving robot 1, thereby providing convenience to the user.

Figure 9:
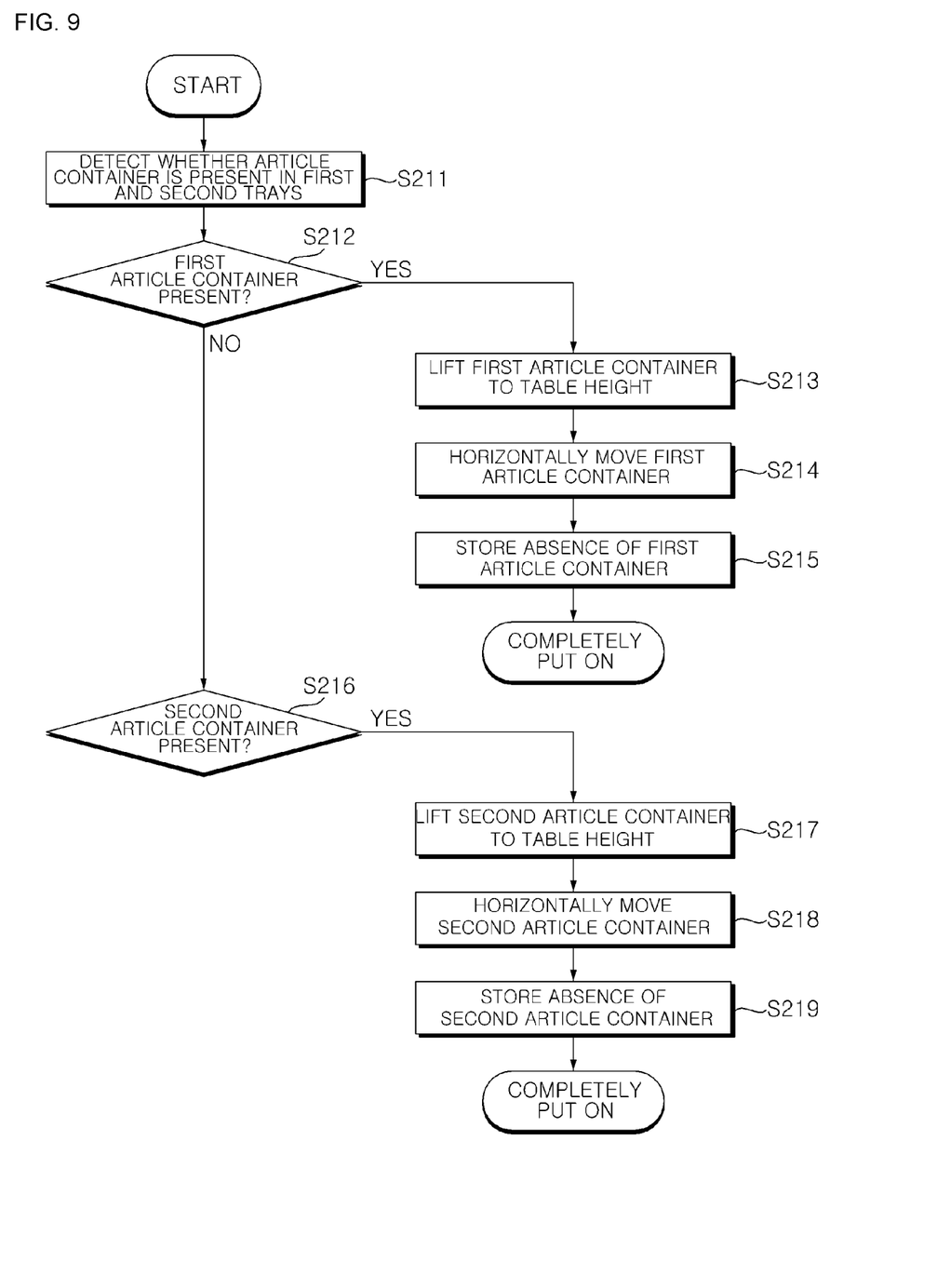
FIG. 9 is a flowchart showing another method of determining a tray of FIG. 7.

When the plurality of trays 400a and 400b are installed, the serving robot 1 according to an embodiment may determine a tray among the trays 400a and 400b, on which an article is disposed, and may perform serving, as shown in FIG. 9.

That is, when the serving robot 1 is moved to the position of the table at the serving position in FIG. 7, the control unit 140 may perform search of determining whether the article containers 200a and 200b are disposed on the trays 400a and 400b, respectively, as shown in FIG. 9 (S211).

The control unit 140 may receive a detection signal indicating that whether the containers 200a and 200b for delivery of an article are respectively put on the trays 400a and 400b, through the sensor unit 110, and may determine a tray among the trays 400a and 400b, on which the article is disposed, based on the detection signal.

For example, when the two trays 400a and 400b are disposed, the control unit 140 may determine whether the first article container 200a is present on the first tray 400a (S212). In this case, as shown in FIG. 8D, when the first article container 200a is present, the first tray 400a may be moved in upward and downward directions to the estimated height of the table (S213) and then the horizontal movement motor 174 may be driven to horizontally move the article container 200a above the first tray 400a to the corresponding table and to put down the article container 200a on the table (S214).

Then, whether the first tray 400a is empty may be determined through the detection signal of the sensor unit 110 above the first tray 400a, the image from the image acquisition unit 120 may be read to check whether the corresponding article container 200a is accurately put on the table, and then a serving operation may be terminated and the serving robot 1 may return to the start point (S215).

When the article container is not disposed on the first tray 400a and the article container 200b is disposed on the second tray 400b below the first tray 400a (S216), the control unit 140 may drive the vertical movement motor 172 to vertically move the first and second trays 400a and 400b to the height of the table (S217).

Then, when the second tray 400b is moved upwards to the height of the table, the horizontal movement motor 174 may be driven and the roller unit 401 above the second tray 400b may be driven to push the article container 200b in a horizontal direction (S218). Accordingly, the article container 200b above the second tray 400b may be moved to the top of the table.

As such, whether the second tray 400b is empty may be determined through the detection signal of the sensor unit 110 above the second tray 400b, the image from the image acquisition unit 120 may be read to check whether the corresponding article container 200b is accurately put on the table, and then a serving operation may be terminated and the serving robot 1 may return to the start point (S219).

Accordingly, the serving robot 1 that reaches the table at the serving position may determine a tray among the plurality of trays 400a and 400b, on which the article containers 200a and 200b are present, and may perform vertical and horizontal movement according to the determination result.

When the plurality of trays 400a and 400b of the serving robot 1 accommodate the different article containers 200a and 200b, respectively, serving positions may be mapped to the trays 400a and 400b, respectively, and serving may be sequentially performed thereon.

That is, a serving position of put on the first tray 400a among the trays 400a and 400b may be set to a first serving position, and a serving position of put on the second tray 400b among the trays 400a and 400b may be set to a second serving position, and then, serving may be performed.

As such, when a plurality of articles are disposed on the different the trays 400a and 400b and serving is performed at one time, the serving robot 1 that leaves from the start point may perform serving a plurality of numbers of times according to the number of the trays 400a and 400b, and then may return to the start point, thereby enhancing efficiency.

The server 2 that receives return information after the serving robot 1 returns may update data based on the return information and may mange the data.

The robot 1 system according to the present invention and the method of controlling the same are not limitedly applied to the constructions and methods of the embodiments as previously described; rather, all or some of the embodiments may be selectively combined to achieve various modifications.

Meanwhile, the method of controlling the system of the robot 1 according to the embodiment of the present invention may be implemented as code that can be written on a processor-readable recording medium and thus read by a processor. The processor-readable recording medium may be any type of recording device in which data is stored in a processor-readable manner. The processor-readable recording medium may include, for example, read only memory (ROM), random access memory (RAM), compact disc read only memory (CD-ROM), magnetic tape, a floppy disk, and an optical data storage device, and may be implemented in the form of a carrier wave transmitted over the Internet. In addition, the processor-readable recording medium may be distributed over a plurality of computer systems connected to a network such that processor-readable code is written thereto and executed therefrom in a decentralized manner.

It will be apparent that, although the preferred embodiments have been shown and described above, the present invention is not limited to the above-described specific embodiments, and various modifications and variations can be made by those skilled in the art without departing from the gist of the appended claims. Thus, it is intended that the modifications and variations should not be understood independently of the technical spirit or prospect of the present invention.

[Description of reference numeral]

| | |
|---|---|
| 1: mobile robot | 2: server |
| 110: sensor unit | 120: image acquisition unit |
| 160: driving unit | 140: control unit | 190: communication unit |

What is claimed:

1. A method of controlling a mobile robot having at least one tray for accommodating an article to be served therein, the method comprising:
receiving user input including a predetermined service request by the mobile robot;
receiving the article to be served in a container, by the mobile robot;
searching for a user, analyzing a gesture of the user, and extracting a table as a serving position the user wants to serve, by the mobile robot;
analyzing an image of the serving position and extracting a distance and height of the serving position;
moving the mobile robot to the serving position and moving the at least one tray in upward and downward directions to lift the article to be served to the height of the serving position; and
putting down the article to be served by a plurality of rollers to be rotated to horizontally move the article to be served, and to put the article at the serving position.

2. The method of claim 1, wherein an image received from an image sensor of the mobile robot is converted into a 3D image, and an outer shape of the user and the gesture of the user are recognized from the 3D image to extract the serving position.

3. The method of claim 2, wherein the extracting the distance and height of the serving position includes acquiring the image of the serving position from the image sensor and performing object learning to extract the distance and height of the serving position.

4. The method of claim 3, wherein the receiving the user input includes receiving order information on the article to be served and information on a target serving position, from a user terminal.

5. The method of claim 4, further including searching for the user at a short distance from the target serving position, following the user, and acquiring an image of the user, by the mobile robot.

6. The method of claim 5, wherein the mobile robot acquires an image in which the article to be served is put at the serving position, transmits information indicating serving is completed to the server, and returns to a start point.

7. The method of claim 3, wherein the receiving the user input includes receiving order information on the article to be served and information on a target serving position, from a server.

8. A mobile robot comprising:
a body forming an outer shape;
a driving part configured to move the body;
an image sensor configured to capture an image of a traveling area and to generate image information;
at least one tray configured to support an article to be served;
a plurality of rollers configured to horizontally move the article to be served and to push the article to be served; and
a controller configured to receive order information of the article to be served, and to control the tray to search for a user, to analyze a gesture of the user, to extract a table as a serving position the user wants to serve, and to move the at least one tray in upward and downward directions to lift, the article to be served to the height of the serving position and to put down the article to be served by the plurality of rollers to be rotated to horizontally move the article to be served, and to put the article at the serving position.

9. The mobile robot of claim 8, wherein the controller analyzes an image of the serving position and extracts a distance and height of the serving position.

10. The mobile robot of claim 9, wherein the mobile robot includes an up and down movement motor configured to move the tray in upward and downward direction.

11. The mobile robot of claim 10, further comprising a horizontal movement motor configured to rotate the plurality of rollers of the tray.

12. The mobile robot of claim 11, wherein the controller converts an image received from the image sensor into a 3D image, and recognizes an outer shape of the user and the gesture of the user from the 3D image to extract the serving position.

13. The mobile robot of claim 12, wherein the controller acquires the image of the serving position from the image sensor and performs object learning to extract the distance and height of the serving position.

14. The mobile robot of claim 13, wherein the mobile robot includes the plurality of trays that are disposed in parallel to each other in a vertical direction and are moveably installed in upward and downward directions.

15. The mobile robot of claim 14, further comprising a communication part configured to receive order information on the article to be served and information on a target serving position, from a user terminal or a server.

16. The mobile robot of claim 15, wherein the mobile robot acquires an image in which the article to be served is put at the serving position, transmits information indicating serving is completed to the server, and returns to a start point.

* * * * *